TRANSISTOR MEMORY CIRCUIT

Filed June 2, 1958 2 Sheets-Sheet 1

Inventors:
Theodore E. Billings,
Charles P. Keshler Jr.,
Harvey W. Wainright,
by Allen E. Amgott
Their Attorney.

Sept. 1, 1959 T. E. BILLINGS ET AL 2,902,674

TRANSISTOR MEMORY CIRCUIT

Filed June 2, 1958 2 Sheets-Sheet 2

Inventors:
Theodore E. Billings,
Charles P. Keshler Jr.,
Harvey W. Wainright,
by Allen E. Amgott
Their Attorney.

United States Patent Office 2,902,674

Patented Sept. 1, 1959

2,902,674

TRANSISTOR MEMORY CIRCUIT

Theodore E. Billings, Ithaca, N.Y., Charles P. Keshler, Jr., Framingham, Mass., and Harvey W. Wainwright, Clinton, N.Y., assignors to General Electric Company, a corporation of New York Application June 2, 1958, Serial No. 739,290

9 Claims. (Cl. 340—173)

The present invention relates to memory circuits, and more particularly to a transistor memory circuit for reading out the voltage level applied during a brief gating period until a new readout level is established during a succeeding gating period.

It has been desirable in many applications to provide circuitry that will accept a voltage level during a brief gating period, and to maintain such level under conditions of continual readout until a new voltage level is established during a subsequent gating period. Such memory circuits are particularly applicable to computer and radar type circuitry wherein the circuits serve the function of providing short term memory. This desire has been particularly troublesome in the employment of transistor circuitry to accomplish the above stated results. Because the transistor is essentially a current controlled device, the voltage level established during a gating period continually falls off as the current drain removes the stored charge.

It is an object of this invention to provide a transistor memory circuit capable of maintaining a voltage level established during a short gating period.

A further object of the invention is to provide means for maintaining the voltage level on a storage device constant during a brief readout period, until a new voltage level is established.

Other objects and many of the attendant advantages of this invention will be readily appreciated as the same becomes better understood by reference to the following detailed description when considered in connection with the accompanying drawings wherein.

As mentioned hereinbefore, use of transistors in computer and radar-type circuitry is extremely desirable. However, the use of transistors in such memory circuits presented a problem because the transistor is essentially a current controlled device. The voltage level on a storage device such as a capacitor used in conjunction with the transistor would leak off and, thus, not maintain the voltage level constant. In accordance with the objects of this invention, there is provided in one embodiment thereof, a storage means chargeable to the level established by an input signal during a brief gating period. Transistor amplifier means coupled thereto provides an output signal proportional to the stored voltage level. A feedback circuit supplies a constant current to said storage means to prevent degradation of the voltage level established by the current drain imposed by the transistor amplifier means.

Figure 1:
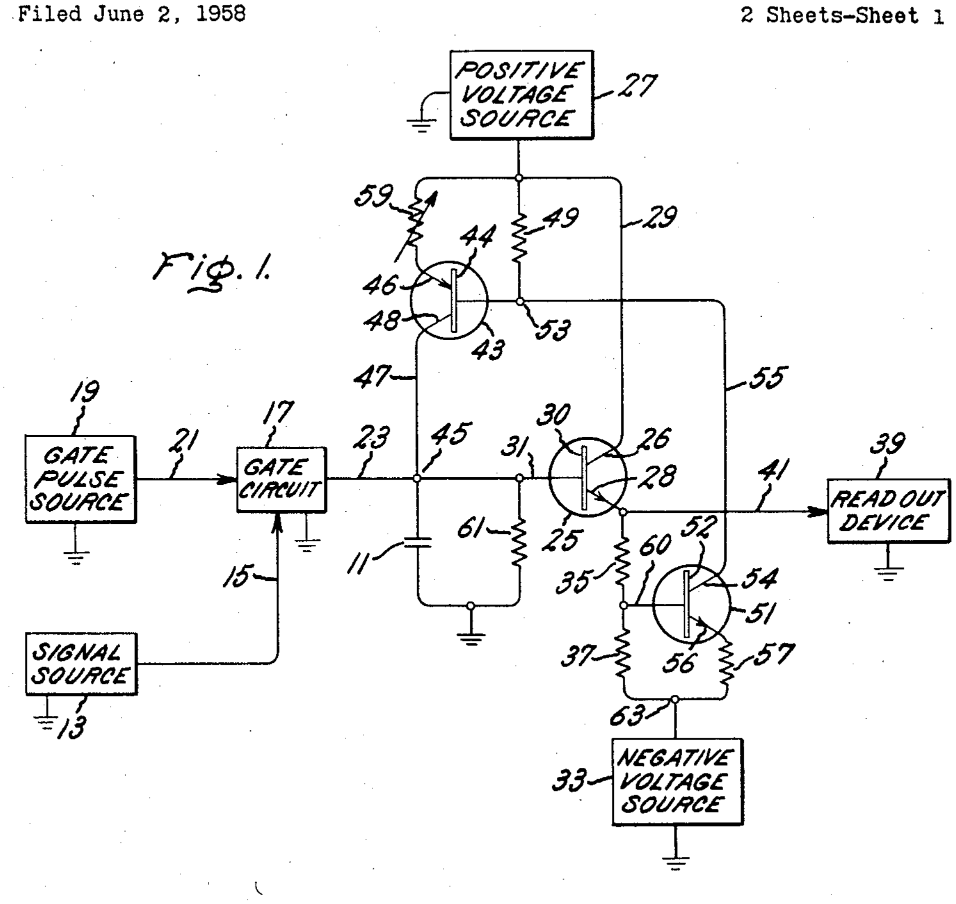
Figure 1 is a schematic diagram of one embodiment of a transistor memory circuit of this invention.
Figure 2:
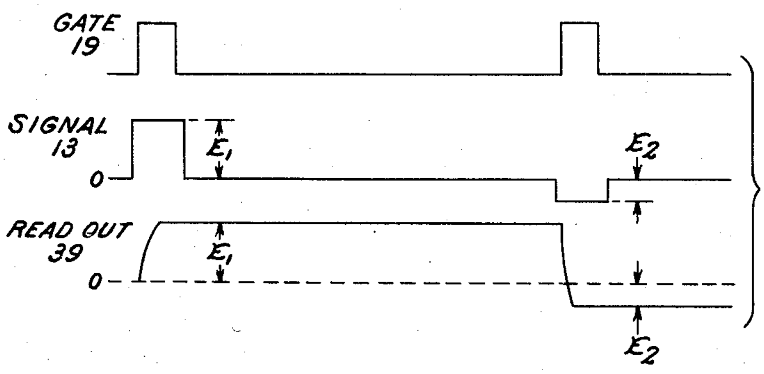
Figure 2 shows representative wave forms at various points of the circuit shown in Figure 1 indicating the timing of the gate, signal and readout voltages.

In Figure 1 there is shown a storage means in the form of a capacitor 11. Signals to be stored on capacitor 11 are supplied from a signal source 13 over connection 15. A gate circuit 17 controlled by a gate pulse source 19 applied over connection 21 insures that only the proper signals from source 13 are applied to capacitor 11 over connection 23. Such gating circuits are well-known to the art and may take the form of a standard series diode switch capable of handling bipolar video signals. Typical signals provided are shown in Figure 2 wherein the signals to be stored and the gate pulses are plotted with voltage magnitude as ordinate to a common time scale as abscissa. When a gate pulse and a signal to be stored coincide, capacitor 11 will charge to a peak signal voltage in a time determined by the relative dimensioning of said capacitor and the internal impedance of the signal source 13. Upon the closing of gate 17, capacitor 11 will remain charged to this magnitude. Gate 17 is so adapted that it will close near the end of the time when the signal 13 has reached its full magnitude, thereby providing sufficient time for capacitor 11 to charge to the new level.

A transistor 25 having a collector electrode 26, an emitter electrode 28 and a base electrode 30 is connected between capacitor 11 and a readout or utilization device 39. Collector electrode 26 is connected to a source of positive voltage 27 over connection 29. The base electrode 30 is connected to capacitor 11 over connection 31 and emitter electrode 28 is connected to a suitable source of negative voltage 33 through a voltage divider circuit comprising a pair of resistors 35 and 37.

Assuming that capacitor 11 is capable of supplying the necessary current to base electrode 30 of transistor 25 without changing the voltage level, readout of a voltage proportional to the input amplitude could be applied to utilization device 39 connected to emitter electrode 28 over connection 41. The desired wave form in such case would follow the envelope of the curve labeled readout shown in Figure 2. However, it will be recognized by those skilled in the art that the input resistance at base electrode 30 of transistor 25 is finite. Therefore, the current drain from capacitor 11 in an exponentially decaying voltage is being applied as readout to the utilization device 39. If it is assumed that the input resistance at base electrode 30 of transistor 25 is constant over the dynamic range of interest, the leakage current from said capacitor will be directly proportional to the voltage thereon with respect to the negative voltage supplied by source 33.

In order to supply this leakage current to transistor 25 and thus prevent degradation of the level of voltage established across capacitor 11, a second transistor 43 is provided. Said transistor includes a base electrode 44, an emitter electrode 46 and a collector electrode 48. Collector electrode 48 of said transistor 43 is connected to a junction 45 by connection 47. The emitter electrode 46 is connected to a suitable source of positive potential 27 through a variable resistor 59. Further, the base electrode 44 of transistor 43 is connected to said positive source 27 through a resistor 49. In order to insure that the starting potential applied to capacitor 11 does not affect the slope of the readout voltage, a third transistor 51 having a base electrode 52, a collector electrode 54 and an emitter electrode 56 is provided. Collector electrode 54 is connected to the junction 53 between resistor 49 and base electrode 44 of transistor 43 by connection 55. Emitter electrode 56 is connected through resistor 57 to said source of negative potential 33 and base electrode 52 is connected to the junction between resistors 35 and 37 by connection 60. The ratio of resistor 49 to resistor 57 determines the proportionality between changes in voltage at junctions 53 and 45, respectively. Thus, if the ratio between the resistance of resistors 49 and 57 were unity, doubling the voltage at junction 45 with respect to negative voltage source 33 would double the voltage drop across the resistor 49. As will be apparent to those skilled in the art, the ratio of resistors 49 and 57 is fixed at the desired voltage feedback ratio. It is to be observed that the collector current supplied by transistor 43 is determined by the resistance of resistor 59 and by the voltage appearing at junction 53. Proper adjustment of the feedback loop, therefore, will provide a collector current from transistor 43 directly proportional to the voltage at junction 45. Thus, there is provided means for supplying a current equal to the current drain from the capacitor 11.

It will be recognized by those skilled in the art that resistor 59 need not be adjustable in order to practice this invention. However, it has been found desirable to make this resistor variable in order to adjust for zero slope of the readout voltage between adjacent pulses and to provide means for circuit adjustment for changes in operating conditions due to the interchange of transistor 51. In order to further increase the linear dynamic range of the circuit, resistor 61 is connected across capacitor 11. Because positive voltages at junction 45 in excess of the linear range exhibit a positive slope due to excessive feedback, and, because negative voltages in excess of the linear range exhibit negative slope due to insufficient feedback, shunt resistor 61 tends to correct for the variation in slope.

The operation of the circuitry of Figure 1 comprises the following steps. A voltage level is gated by means of gate circuit 17, gate pulse source 19 and signal source 21 so as to charge capacitor 11. Said voltage level is sensed and appropriately modified by means of transistors 25 and 51 acting as a buffer and amplifier, respectively, and applied to transistor 43 which acts as a current source in such a manner as to provide a constant current directly proportional to the voltage level established on capacitor 11. Said constant current source supplies the current that leaks off capacitor 11 into the finite input resistance of the buffer. Because a constant current is continually supplied to base electrode 30 of the buffer, a constant current will flow from emitter electrode 28. The emitter current is greater by the gain of transistor 25 and will sustain a constant readout voltage across a load resistance in readout device 39 at a reasonably low impedance level. The readout voltage will follow the input voltage directlly and be at a slightly lower voltage because of the internal resistance drop in transistor 25.

From the foregoing description, it is seen that a transistor circuit for reading out the voltage level applied during a brief gating period until a new readout level is established during the next gating period is provided. Buffer transistor 25 provides means for obtaining a constant readout of the voltage level established on capacitor 11. In addition said buffer isolates the signal and provides power amplification. Still further, resistor 37 may be utilized for sampling the signal and provides means for measuring the current for feedback purposes to capacitor 11. The feedback loop includes resistor 37, transistor amplifier 51 and a constant current source including transistor 43. It will be recognized by those skilled in the art that a single voltage supply can be used in the circuitry of Figure 1 where the input signal or signal source is always positive and the reference level is greater than zero.

Figure 3:
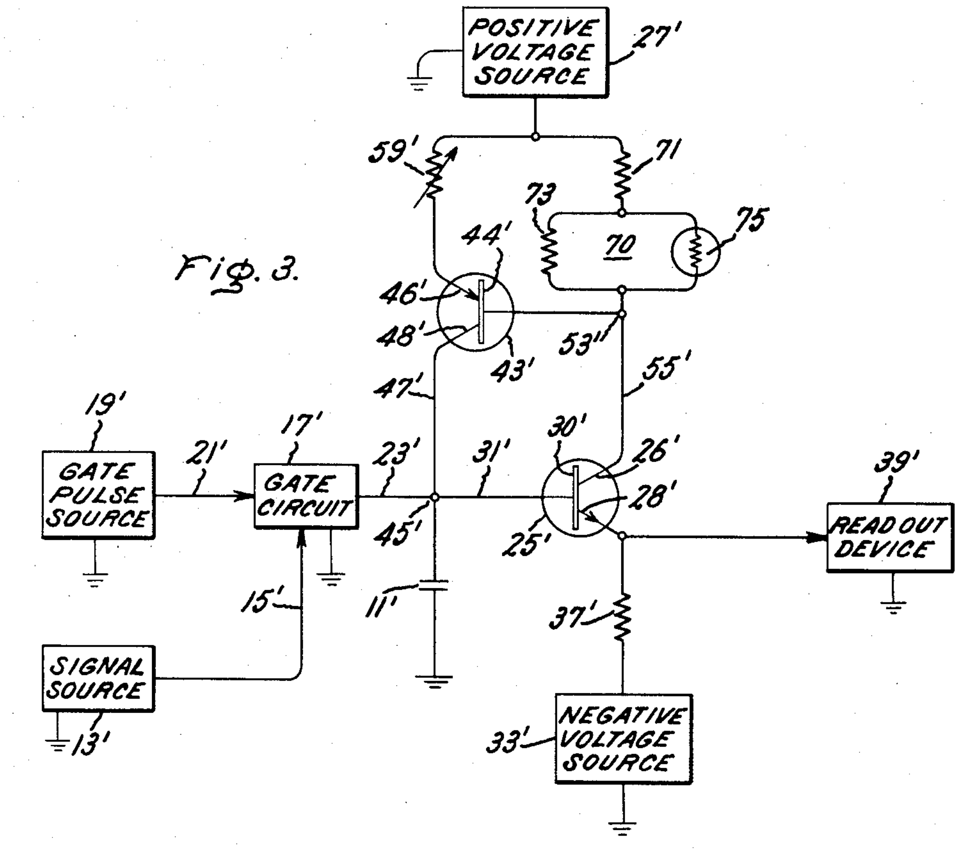
Figure 3 is a schematic diagram of another embodiment of a transistor memory circuit of this invention.

The circuitry of Figure 1 can be further simplified. In Figure 3, there is shown an alternate embodiment of the invention of Figure 1 wherein like numbers refer to like elements. It is to be observed that transistor 51 is eliminated and collector electrode 26′ is connected directly to junction 53′ by conductor 55′.

The operation of the Figure 3 circuit is essentially the same as that of Figure 1 with the exception that the dynamic range, i.e., the percent of supply voltage is lower. In order to compensate for temperature variations within the circuit due primarily to the collector cut-off current, $I_{co}$, of transistors 25′ and 43′, a thermistor network 70 comprising resistors 71 and 73 and thermistor 75 is inserted between positive voltage source 27′ and junction 53′. It is to be observed that the $I_{co}$ of a transistor increases exponentially with increases in temperature in a predictable manner. By means of thermistor network 70, such variations in temperature are minimized.

While particular embodiments of the present invention have been shown and described herein, it is not intended that the invention be limited to such disclosures, but that changes and modifications can be made and incorporated within the scope of the claims.

What is claimed is:

1. A constant current memory circuit comprising means for storing a voltage level, transistor means coupled to said storage means for amplifying such voltage level, and feedback means coupled to both said transistor means and said storage means for preventing a change in the voltage level stored in said storage means caused by a current drain into said transistor amplifying means.

2. A constant current memory circuit comprising means for storing a voltage level, transistor means coupled to said storage means for amplifying such voltage level, and feedback means coupled to said transistor means for preventing a change in the voltage level stored in said storage means caused by a current drain into said transistor amplifying means, said feedback means comprising means to supply said storage means with a constant current directly proportional to the amplitude of the voltage stored therein.

3. A constant current memory circuit comprising means for storing a voltage amplitude, means for amplifying said stored voltage, said amplifying means including a transistor having a base, emitter and collector electrodes, said base electrode being coupled to said storage means, a source of biasing potential, resistor means coupling said biasing source to said emitter electrode, and means for preventing change of the amplitude in the stored voltage caused by current drain into said amplifying means including means for supplying a current matching said current drain.

4. A constant current memory circuit comprising means for storing a voltage amplitude, means for amplifying said stored voltage, said amplifying means including a transistor having a base, emitter and collector electrodes, said base electrode being coupled to said storage means, a source of biasing potential, resistor means coupling said biasing source to said emitter electrode, and means for preventing change of the amplitude in the stored voltage caused by current drain into said amplifying means including means for supplying a current matching said current drain, said last means comprising means to supply said storage means with a constant current directly proportional to the amplitude of the voltage stored therein.

5. A transistorized constant current memory circuit comprising means for storing a voltage level, transistor means coupled to said storing means for simultaneously sensing and amplifying such voltage level, and feedback means coupled to said transistor means for preventing a change in the voltage level in said storing means caused by a current drain into said sensing and amplifying means.

6. The invention as defined in claim 5 wherein said feedback means includes thermistor means for compensating for temperature variations in said transistor means.

7. A transistorized constant current memory circuit capable of accepting a voltage level during a brief gating period and maintaining such voltage level while continually reading out comprising means for storing a voltage level, a first transistor having a base, emitter and collector electrodes for simultaneously sensing and amplifying said voltage level, said base electrode being coupled to said storage means, means for preventing a change of the voltage level caused by current drain into the base electrode of said first transistor, said last-mentioned means comprising a second transistor having a base, emitter and collector electrodes, the collector electrode of said second transistor being coupled to the base electrode of said first transistor, a source of biasing potential, and resistor means coupling said biasing source to the emitter electrodes of both said first and second transistors and to the base electrode of said second transistor, the collector electrode of said first transistor being coupled to the base electrode of said second transistor.

8. The invention as defined in claim 7 including a utilization device coupled to the emitter electrode of said first transistor for accepting the voltage level developed thereon.

9. A transistorized constant current memory circuit capable of accepting a voltage level during a brief gating period and maintaining such voltage while continually reading out comprising a capacitor for storing a voltage level, a first transistor having a base, emitter and collector electrodes for simultaneously sensing and amplifying said voltage level, said base electrode being coupled to said storage means, a first source of biasing potential, resistor means coupling said biasing source to said emitter electrode, feedback means for preventing a change of the voltage level caused by current drain into the base electrode of said first transistor, said feedback means comprising a second transistor having a base, emitter and collector electrodes, the collector electrode of said second transistor being coupled to the base electrode of said first transistor, a second source of biasing potential, and a second resistor means for coupling said second biasing source to both the emitter and base electrodes of said second transistor, the collector electrode of said first transistor being coupled to said second biasing source.

No references cited.